United States Patent [19]

Vince

[11] Patent Number: 4,562,539

[45] Date of Patent: Dec. 31, 1985

[54] DATA PROCESSING SYSTEM

[75] Inventor: Nigel L. Vince, Crewe, England

[73] Assignee: International Computers Limited, London, England

[21] Appl. No.: 467,384

[22] Filed: Feb. 17, 1983

[30] Foreign Application Priority Data

Apr. 28, 1982 [GB] United Kingdom ............... 8212262

[51] Int. Cl.[4] .................... G06F 15/16; G06F 13/42
[52] U.S. Cl. ....................................... 364/200; 370/86
[58] Field of Search ... 364/200 MS File, 900 MS File; 370/89, 90, 86; 340/825.05

[56] References Cited

U.S. PATENT DOCUMENTS

| 3,845,474 | 10/1974 | Lange | 364/200 |
|---|---|---|---|
| 3,889,237 | 6/1975 | Alferness | 364/200 |
| 4,007,450 | 2/1977 | Haibt et al. | 364/200 |
| 4,019,176 | 4/1977 | Cour | 364/900 |
| 4,136,386 | 1/1979 | Annunziata | 364/200 |
| 4,322,795 | 3/1982 | Lange | 364/200 |
| 4,385,351 | 5/1983 | Matsuura | 364/200 |
| 4,432,057 | 2/1984 | Daniell et al. | 364/200 |
| 4,445,174 | 4/1984 | Fletcher | 364/200 |
| 4,491,946 | 1/1985 | Kryskow et al. | 370/89 |

Primary Examiner—James D. Thomas
Assistant Examiner—Florin Munteanu
Attorney, Agent, or Firm—Lee, Smith & Zickert

[57] ABSTRACT

A data processing system comprising multiple processing nodes each containing a processor and a data store. The store holds local data, and also holds copies of shared data required by the node. This reduces conflict between the nodes in accessing the shared data. When one node updates the shared data, it sends an update message to all the other nodes over a transmission link. The processor is then free to continue processing. When the message reaches the other nodes, it updates the other copies of the shared data, so as to ensure consistency. Each node receives messages from the link in the same order, and this defines a unique chronological order for the updates, even though the nodes are asynchronous. A node is temporarily suspended if an update occurs out of this correct chronological order.

8 Claims, 3 Drawing Figures

DATA PROCESSING SYSTEM

BACKGROUND TO THE INVENTION

This invention relates to data processing systems of the kind having a plurality of data processing units (referred to herein as processing nodes) having access to shared data, common to two or more nodes. The invention is applicable both to multi-computer systems, in which the nodes are substantially independent computers, and to multi-processor systems in which the nodes interact co-operatively to perform programs and share common resources such as input/output devices.

In a conventional multi-processor system, the shared data is held in a common store, accessible to all the nodes. Each node may also have its own private store for holding non-shared data unique to that node. A problem with such a system is that the nodes must compete for access to the shared store and hence there may be conflict between different nodes attempting to access the shared store simultaneously. Moreover, there may be significant transmission delays between the nodes and the shared store. As a result, access to the shared data may be very slow.

U.S. Pat. No. 3,889,237 describes a dual processor system in which each processor has its own store and each store contains a duplicate copy of the shared data. To ensure that both copies are kept consistent, each processor has direct access to the store of the other processor so that it can write a new value of the shared data into both stores simultaneously. A problem with this prior proposal is that there may be conflict between the processors if both attempt to access the same store unit at the same time, and each processor must wait for all writes to the shared data to be completed before it can continue processing. This seriously reduces the efficiency of the system. Moreover, in this prior proposal, the shared data must be held in a fixed set of locations in each store, and this can prevent the efficient allocation of storage space in the processors. Both these problems make it very difficult to extend this proposal to more than two processors.

One object of the present invention is to alleviate these problems.

SUMMARY OF THE INVENTION

According to the present invention a data processing system comprises a plurality of processing nodes interconnected by at least one data transmission link, each node comprising:

(a) a data store holding local data items unique to the node and also holding shared data items copies of which are also held in at least one other node, and, (b) a data processor capable of reading and updating data items in the data store, characterised in that;

(a) whenever the processor in one node updates a shared data item, the node generates a message containing the updated value of the item and its address and transmits the message over the link to the other nodes, the processor being capable of continuing with its processing without waiting for the message to reach the other nodes, and (b) when the message is received by the other nodes, it is used to update the copies of the shared data item held in the stores of those nodes, thereby ensuring that all copies of the shared data item are kept consistent.

It can be seen that the invention provides rapid access to the shared data, since a copy is held locally in each node and each processor accesses only the store in the same node. The problem of conflict between different processors attempting to access the same store is avoided since, when a node transmits a message to update an item of shared data, it is free to continue processing and does not have to wait for all the copies of the shared item in the other nodes to be updated.

In a preferred system in accordance with the invention, th address contained in each said message is the virtual address of the data item, each node identifying the same shared data item by the same virtual address.

The fact that the message contains a virtual rather than a real address means that different nodes can store the shared data at different locations. This facilitates storage allocation in the nodes.

One data processing system in accordance with the invention will now be described, by way of example, with reference to the accompanying drawings.

DESCRIPTION OF AN EMBODIMENT OF THE INVENTION

Overall system

Figure 1:
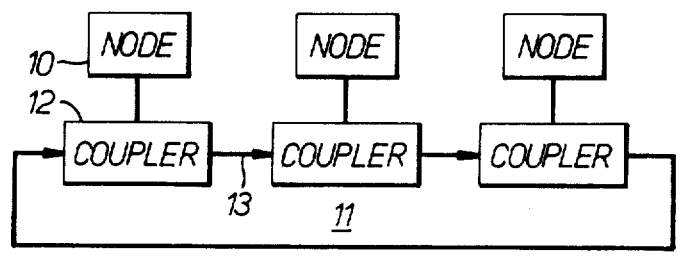
FIG. 1 is an overall diagram of the data processing system.

Referring to FIG. 1, the data processing system comprises a plurality of processing nodes 10 interconnected by a communication link 11. The link comprises a plurality of couplers 12, one for each node, connected together in a ring by unidirectional transmission paths 13.

The link 11 is organised as a token ring, in which a special bit pattern, referred to as the token, is passed around the ring from one coupler to the next. Whenever a coupler has a message to send, it waits until it receives the token, removes it from the ring, and then transmits its message. The message travels round the ring, being copied by each coupler in turn as it passes through, until it finally arrives back at the originating coupler where it is removed from the ring. After receiving its message, the coupler generates a new token which is passed on to the next coupler. There is only one token and hence only one message can be on the ring at a time.

Token rings are well known in the art and so it is not necessary to describe the link 11 in detail. Such rings are described, for example, in "An introduction to local area networks" by Clark, Pogran and Reed, Proceedings of the IEEE, November 1978, pages 1497–1516.

It can be seen that the link has the property that each node receives messages from the link in the same sequence. The importance of this feature is that it establishes a globally unique chronological order for the messages, even though the individual nodes are operating asynchronously.

Processing Node

Figure 2:
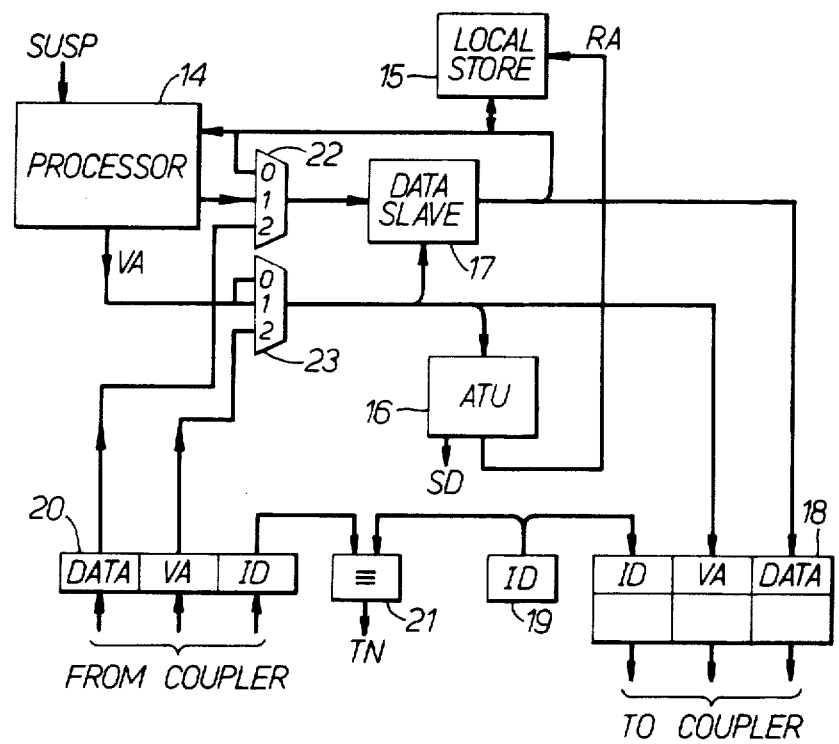
FIG. 2 is a diagram of one processing node.

Referring to FIG. 2, each processing node 10 includes a data processor 14, a local data store 15, an address translation unit (ATU) 16, and a data slave 17. Each of these units is well known as such and so will not be described in detail herein.

The local store 15 is a random access memory which holds local data unique to the node, and also shared data common to at least one other node. The data unique to the node includes address translation tables for translating virtual addresses into real addresses.

The processor 14 is arranged to execute instructions performing processing operations on the data. Some of these instructions are READ or WRITE instructions specifying that a data item should be read from or written to the local store 15. Each such instruction produces a virtual address which specifies the identity of the required data item. Each node identifies a given data item by the same virtual address. However, the physical location of the data may be different in different nodes.

Before a data item can be accessed, the virtual address must be translated into the corresponding real address by the ATU 16. This unit contains a small associative memory (not shown), referred to as the address translation slave, which holds copies of the most recently used translation table entries. This slave provides rapid address translation in the majority of cases. In those cases where the required address translation table entry is not in the address translation slave, an interrupt signal is generated, causing the processor 14 to be interrupted. This initiates a special routine which consults the address translation tables in the local store 15 and loads the required entry into the translation slave. This address translation procedure is well known and so will not be described in further detail.

In the present system, each address translation table entry contains an extra flag bit SD (shared data) which is set if the corresponding data item is shared between two or more nodes. This flag is read out of the address translation unit 16 whenever a virtual address is translated.

The data slave 17 contains a small associative memory having a faster access time than the local store, for holding copies of the most recently used data items, along with their virtual addresses. This slave provides rapid access to data items in the majority of cases.

The node also includes an output buffer 18 capable of holding a queue of update messages awaiting transmission over the link. Each message contains:

(a) the updated value of a shared data item, (b) the virtual address VA of that item, and (c) an identity tag ID, obtained from an identity register 19 which contains a hard-wired identity number unique to the node.

The message may also include a SIZE field indicating the number of bytes in the data item, if the items are of variable length.

The messages are held in the buffer 18 until the token is received by the associated coupler 12, allowing transmission to begin. The messages in the buffer 18 are transmitted in chronological order (i.e. first into the buffer is the first out).

Each message received over the link 11 by the node (including messages originating from itself) is copied into an input buffer 20. This buffer need only be large enough to hold one message. The identity tag ID of the message in the buffer 20 is compared in a comparator 21 with the contents of the identity register 19, to produce a control signal TN (this node) which is true if the two identities are equal. In other words, TN=1 indicates that the message in the buffer 20 originated in this node.

A multiplexer 22 selects one of the following inputs for application to the data input of the data slave 17:

(0): data from the local store 15.

(1): data from the processor 14.

(2): data from the buffer 20.

Another multiplexer 23 selects one of the following inputs for application to the address inputs of the ATU 16 and data slave 17:

(0) and (1): the virtual address VA from the processor 14.

(2): the virtual address from the buffer 20.

Figure 3:
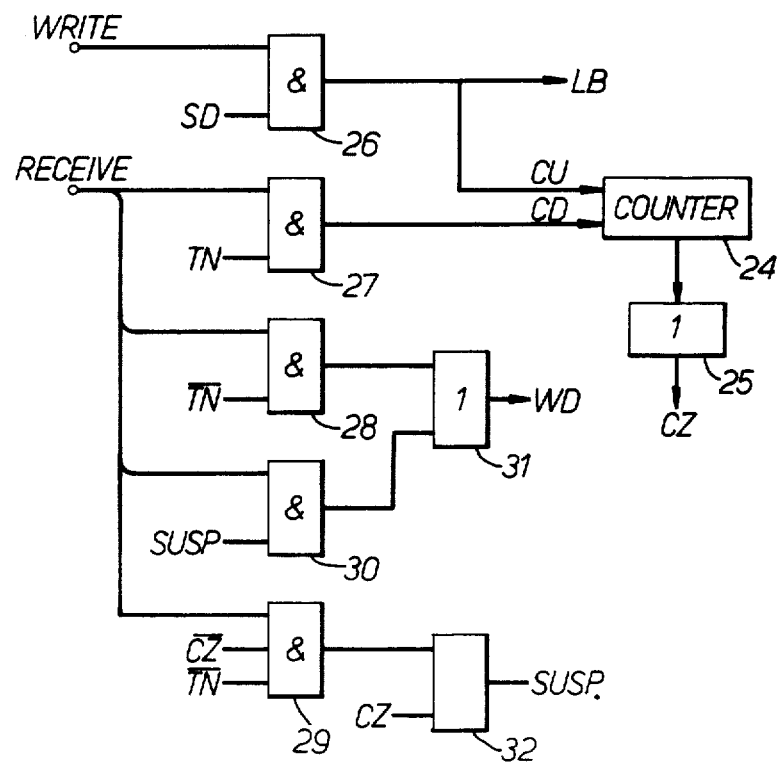
FIG. 3 is a diagram of control circuitry in one node.

Referring to FIG. 3, the node also includes a counter 24 having a control input CU (count up) which increments it by one, and another input CD (count down) which decrements it by one. As will be explained, the counter 24 provides a record of the number of outstanding messages in the node i.e. messages which have been generated by the node and which have not yet been received back into the buffer 20. The output of the counter 24 is fed to a NOR gate 25 which detects the all-zero state of the counter and produces a signal CZ (counter zero). Thus, CZ=1 indicates that there are no outstanding messages in this node.

Operation (1) READ Instruction

When the processor 14 executes a READ instruction, it switches the multiplexers 22,23 to their inputs marked 0. The virtual address from the processor is therefore applied to the data slave 17 and the ATU 16. If the required data item is resident in the data slave, it is read out immediately and returned to the processor. If, on the other hand, the required data item is not resident in the slave, the virtual address is translated and the resulting real address is applied to the local store 15. The required data item is then read out of the local store and returned to the processor. At the same time, the data item is copied into the data slave 17 along with its virtual address. The action of the READ instruction is conventional and so the related control circuits will not be described.

(2) WRITE Instruction

Whenever the processor 14 executes a WRITE instruction, it switches the multiplexers 22,23 to their inputs marked 1. The virtual address from the processor is therefore applied to the data slave 17 and the ATU 16, and the data item to be written is applied to the data slave. The data item is then written into the slave. At the same time, the virtual address is translated, the local store 15 is addressed, and the data item is copied into the local store from the slave. This ensures that the local store is consistent with the slave. The WRITE instruction, as described so far, is conventional and so the related control circuits will not be described herein.

Referring again to FIG. 3, the WRITE instruction also activates one input of an AND gate 26, the other input of which receives the shared data flag SD from the ATU 16. Hence, the AND gate 26 is enabled if the data item being updated by the WRITE instruction is a shared data item. The output of the gate 26 produces a control signal LB (load buffer) which is applied to the output buffer 18 causing a message to be loaded into it. This message will then, in due course, be broadcast to the other nodes so as to update all the other copies of the shared data item. The output of the gate 26 is also applied to the count-up input CU of the counter 24. This updates the record in the counter 24 of the number of outstanding messages.

(3) Receive Message

Whenever a message is received into the input buffer 20, it switches the multiplexers 22,23 to select their inputs marked 2, and also activates one input of each of four AND gates 27, 28, 29 and 30.

The other input of gate 27 receives the signal TN. Hence, gate 27 is enabled whenever a message is received which originated at this node. The output of the gate 27 is applied to the count-down input CD of the counter 24 causing it to be decremented by one, indicating that one of the outstanding messages has been received.

Gate 28 receives the inverse of the signal TN. Hence, gate 28 is enabled if the message in the buffer 20 originated from another node. The output of gate 28 enables an OR gate 31, producing a signal WD which causes the data item in the buffer 20 to be written into the data slave 17 and then into the local store 15, as if this was a normal WRITE instruction. It should be noted, however, that if a copy of the data item is not held in this node (a shared data item is not necessarily held in every node), the ATU will not recognise the virtual address in the buffer 20 and so no write will take place.

The action of writing the item to the data slave eliminates the need to purge the data slave before access, as is normally required in conventional systems having a shared main store.

It should be noted that update messages originating from the node itself are not normally written into the local store when received from the link, since the data item in question has already been updated at the time the message was created (as described above under the heading "WRITE instruction").

If the node receives an update message from another node while it (the first node) still has at least one outstanding update message, the received message may overwrite the data item which has already been updated by the first node at the time it created the outstanding message. The data item would thus be overwritten by a chronologically earlier value, and this is clearly incorrect. (It will be recalled that the chronology of the updates is determined by the order in which the update messages are received from the link). This situation is detected by the AND gate 29, which receives the inverses of the signals CZ and TN. The output of the gate 29 sets a bistable 32 producing a signal SUSP (suspend) which causes the processor 14 to suspend its operation. The processor then remains suspended until the counter 24 returns to zero, indicating that all outstanding messages have been received. The signal CZ then resets the bistable 32, removing the suspension.

While the processor is suspended, the local store can still be updated by incoming messages, and in this case it is updated by all incoming messages, not just those from other nodes. This ensures that, by the time the suspension is removed, all the data items will have been brought completely up-to-date. This is achieved by means of the AND gate 30 which is enabled by the signal SUSP, the output of gate 30 being applied to the OR gate 31 to produce the signal WD.

Some possible modifications

In the system described above, the node is suspended if it receives an update message from another node while there are one or more update messages still outstanding from this node. This can sometimes lead to unnecessary suspensions: it is strictly only necessary to suspend processing if the update message from the other node refers to the same data item as one of the outstanding updates.

In a modification of the system described above, these unnecessary suspensions may be reduced by providing each node with a hash-addressed or associatively addressed bit map which effectively stores a record of the virtual address of each data item updated by the node. This bit map may conveniently be implemented by appending an extra bit MO (message outstanding) to each entry in the data slave 17. The control circuits in FIG. 3 are modified as follows:

(a) The output of the AND gate 26 provides a further signal which sets the bit MO in the currently addressed location of the data slave.

(b) The signal CZ is used to clear the bit map by resetting all the bits MO, as well as resetting the bistable 30.

(c) The input $\overline{CZ}$ to the gate 29 is replaced by the bit MO from the currently addressed location of the slave.

The result of this modification is that suspension occurs only if an update message is received from another node, referring to a virtual address which has been tagged by the bit map.

It should be noted, however, that once a bit in the bit map has been set, it is not cleared until CZ=1, indicating that all outstanding messages have been received. The reason for this is that the node may have updated two or more data items whose virtual addresses map on to the same bit of the bit map, and it would therefore not be correct to clear the message outstanding bit MO on receipt of the first of these messages. The result of this is that, although the bit map reduces the number of unnecessary suspensions, it does not eliminate them entirely.

In a further modification of the system described, the unnecessary suspensions may be eliminated entirely by replacing the bit map and the counter 24 by a plurality of counters, one for each location of the data slave. The output of AND gates 26 and 27 are then used to increment or decrement only the counter corresponding to the addressed location of the slave. In this way, a record can be kept of the number of outstanding messages relating to each location of the slave. This can then be used to ensure that suspension occurs only when it is strictly necessary.

In another possible modification of the invention, instead of a single transmission link 11, the nodes may have a plurality of links interconnecting them. Traffic is allocated to the links in such a manner that messages relating to a given area of virtual store are all sent over the same link; independent areas of virtual store may be allocated to separate links provided that no process or chain of processes relies on exact chronology being maintained between these area. The use of a plurality of links increases the traffic capacity between the nodes. It also helps to make the system tolerant to failure in one of the links, since traffic on that link could be reallocated to another link.

It should be noted that the invention is not restricted to a communications link in the form of a token ring. Any convenient form of link may be used provided it satisfies the criterion mentioned above, that all nodes are guaranteed to receive the messages from the link in the same sequence. For example, the link may be a store-and-forward packet-switched network, in which case the criterion can be satisfied by ensuring that all messages pass through a single process whose responsibility it is to forward the messages to each recipient on the link in the same order.

In the above description, it was stated that each node refers to each shared data item by the same virtual address. This requirement could be removed by introducing another level of address translation. Each node would then refer to a shared data item by a unique virtual address, and this would be translated into a common virtual address for insertion into an update message.

The invention has been described in terms of a multiprocessor system. However, another possible application of the invention is in a distributed data base system. In this case, each node would be a database processor and would include a number of file storage devices corresponding to the local store.

Semaphores

The shared data in the nodes may include semaphore data. A semaphore is a data item associated with a particular area of store (e.g. a data file) which is used to control access to that area by independent processes, so as to ensure that only one process at a time can access the data. In the described system, semaphore operations are performed by broadcasting a semaphore message over the link. Receipt of this message by a node other than the originator causes the value of the semaphore location to be updated. The originator awaits the return of the message from the link before performing the semaphore operation on the semaphore location in its own local store. This ensures that semaphore locations are maintained in absolute synchronism across all the nodes.

I claim:

1. A data processing system comprising a plurality of processing nodes interconnected by data transmission means for receiving messages from the nodes and delivering the messages in the same sequence to all the nodes including the nodes which originated the messages, each node comprising:
    (a) a data store holding data items unique to the node and also holding a copy of each of a plurality of shared data items,
    (b) a data processor coupled to the data store for reading and updating data items in the store,
    (c) means responsive to the processor updating a shared data item, for generating a message containing the updated value of the data item and its address,
    (d) means for transmitting the message over the transmission means,
    (e) means for receiving messages from the transmission means,
    (f) means responsive to the reception of a message originating from another node, for updating the shared data item identified by the address contained in the message,
    (g) means for producing a signal whenever a message has been generated by the node but has not yet been received back from the transmission means, and
    (h) means operative upon reception of a message originating from another node, while said signal is present, for temporarily suspending operation of the processor.

2. A system according to claim 1 wherein the signal producing means comprises:
    (a) a counter,
    (b) means for incrementing the counter whenever a message is generated by the node,
    (c) means for decrementing the counter whenever the node receives a message originating from itself, and
    (d) means for generating said signal when the counter is non-zero.

3. A system according to claim 1 wherein each node includes a first-in first-out buffer for holding a queue of generated messages awaiting transmission.

4. A system according to claim 3 wherein the signal producing means comprises:
    (a) a counter,
    (b) means for incrementing the counter whenever a message is added to said buffer,
    (c) means for decrementing the counter whenever the node receives a message originating from itself, and
    (d) means for generating said signal when the counter is non-zero.

5. A system according to claim 1 wherein the transmission means comprises a ring network having means for permitting only one message at a time to be present on the ring.

6. A system according to claim 1 wherein said address contained in each said message is a virtual address.

7. A method of operating a data processing system comprising a plurality of processing nodes, each node including a data store and a data processor coupled to the store, and data transmission means for receiving messages from the nodes and delivering the messages in the same sequence to all the nodes, the method comprising the steps:
    (a) storing local data items unique to individual nodes in the data stores of the respective nodes,
    (b) storing copies of shared data items in the data stores of respective nodes,
    (c) whenever the processor in one node updates the copy of a shared data item held in the data store of that node, generating in said one node a message containing the updated value of the shared data item and its address, and making a record that a message has been generated,
    (d) transmitting the message from said one node over the link to all the nodes, including said one node,
    (e) enabling the processor in said one node to continue processing without waiting for the message to reach the other nodes,
    (f) when the message is received by the other nodes, updating the copies of the shared data item held in the data stores of those other nodes,
    (g) when the message is received back from the link by said one node, canceling said record, and
    (h) in the event that a message originating from another node is received by said one node while said record is present, temporarily suspending operation of the processor in said one node.

8. A system according to claim 7 wherein each node includes a counter, and wherein the step of making a record that a message has been generated comprises incrementing the counter, and the step of canceling said record comprises decrementing the counter.

* * * * *